United States Patent
Lisec

[19]

[11] Patent Number: 6,053,011
[45] Date of Patent: Apr. 25, 2000

[54] PROCESS AND PLANT FOR HARDENING GLASS PLATES

[76] Inventor: Peter Lisec, Bahnhofstrasse 34, A-3363 Amstetten-Hausmening, Austria

[21] Appl. No.: 08/945,925

[22] PCT Filed: Mar. 10, 1997

[86] PCT No.: PCT/AT97/00048

§ 371 Date: Jan. 26, 1998

§ 102(e) Date: Jan. 26, 1998

[87] PCT Pub. No.: WO97/34844

PCT Pub. Date: Sep. 25, 1997

[30] Foreign Application Priority Data

Mar. 21, 1996 [AT] Austria .................................. A 524/96
Feb. 14, 1997 [AT] Austria .................................. A 252/97

[51] Int. Cl.[7] .................................................. C03B 27/00
[52] U.S. Cl. .................................. 65/104; 65/24; 65/25.4; 65/25.2; 65/102; 65/106; 65/114; 65/182.2; 65/182.1; 65/348; 65/349; 65/350; 65/351; 65/355
[58] Field of Search .............................. 65/24, 25.1, 25.2, 65/25.4, 102, 104, 106, 114, 115, 182.2, 182.1, 348, 349, 350, 351, 355, 356

[56] References Cited

U.S. PATENT DOCUMENTS

| | | | |
|---|---|---|---|
| 2,928,158 | 3/1960 | Miller | 65/351 |
| 3,147,104 | 9/1964 | Dunipace et al. | 65/349 |
| 3,293,015 | 12/1966 | Fredley et al. | 65/114 |
| 3,630,706 | 12/1971 | Oelke et al. | 65/106 |
| 3,637,362 | 1/1972 | Oelke et al. | 65/182.2 |
| 3,942,967 | 3/1976 | Jack et al. | 65/114 |
| 4,422,541 | 12/1983 | Lisec . | |
| 4,563,206 | 1/1986 | Benard | 65/348 |
| 5,125,948 | 6/1992 | Vanaschen et al. | 65/351 |
| 5,472,469 | 12/1995 | Yli-Vakkuri et al. | 65/106 |
| 5,685,437 | 11/1997 | Lisec . | |

FOREIGN PATENT DOCUMENTS

| | | |
|---|---|---|
| 0 010 854 | 5/1980 | European Pat. Off. . |
| 0 603 151 | 6/1994 | European Pat. Off. . |
| 603151 | 6/1994 | European Pat. Off. . |
| 0 704 389 | 4/1996 | European Pat. Off. . |
| 2 150 300 | 4/1973 | France . |
| 664 602 | 9/1938 | Germany . |
| 1 421 786 | 10/1963 | Germany . |
| 2 129 704 | 2/1972 | Germany . |
| 30 38 425 | 4/1982 | Germany . |
| 1 309 707 | 3/1973 | United Kingdom . |

Primary Examiner—Stanley S. Silverman
Assistant Examiner—Michael P. Colaianni
Attorney, Agent, or Firm—Young & Thompson

[57] ABSTRACT

A system for tempering glass plates has preheating zone (1) in which several glass plates (7) stacked vertically in compartmented car (6) are heated together to a temperature below the tempering temperature of for example 650° C. (for example 300° C.). Preheated glass plates (7) are moved individually from preheating zone (1) into heating zone (2). In heating zone (2) glass plates (7) are heated to the tempering temperature, their being inclined to the vertical at an acute angle and being held by air cushions between two heating plates. On the lower edge of the two heating plates of heating zone (2) there is transport device which supports glass plates (7) simultaneously to the bottom. Glass plates (7) heated to the tempering temperature are moved into cooling zone (3) which has cooling plates aligned parallel to the heating plates and between which glass plate (7) is pushed for quenching. The cooling plates can also be placed on the two sides of glass plate (7) to be tempered for purposes of quenching. The quenched glass plates which still have a temperature of for example 300° C., are transported into after-cooling zone (4) in which they are slowly cooled to room temperature after being deposited in compartmented cars (6).

Because glass plates (7) are placed in heating zone (2) and cooling zone (3) obliquely, not horizontally, there are no problems with support and transport of glass plates (7). Joint preheating of glass plates (7) and joint cooling of glass plates (7) to room temperature after quenching thereof save considerable energy since the heating and cooling power in preheating zone (1) and aftercooling zone (4) can be low.

31 Claims, 3 Drawing Sheets

PROCESS AND PLANT FOR HARDENING GLASS PLATES

The invention relates to a process with the feature of the introductory part of the preamble of claim 1.

The invention furthermore relates to a system (device) with the features of the introductory part of the independent apparatus claim.

Glass plates are tempered by heating them to a temperature ("tempering temperature") above 650° C. and then quenching them at a temperature which is below the critical temperature, for example less than 300° C., so that stresses which temper the glass form due to the shock cooling.

In the known devices the cost for heating the glass plates and the quenching costs thereof are very high. In particular in the known devices considerable amounts of energy are needed for operating the fan which delivers the heated gases for heating the glass plates.

The object of the invention is to improve glass tempering and the systems provided for this purposes such that the cost in energy and time is reduced and good glass tempering is still achieved.

As claimed in the invention this object is achieved with the features of the main process claim. With regard to the proposed system (device) as claimed in the invention the object is achieved with the features of the independent main apparatus claim.

Because in the invention glass plates are preheated for example together and then heated to the required tempering temperature preferably individually and furthermore quenching to a temperature below the critical temperature is done preferably individually and the glass plates are then cooled for example together to room temperature, large amounts of time and energy are saved, since the heating and cooling zones need only be short. The invention is based on the finding that it is enough for tempering of glass plates if the temperature jump from the tempering temperature, for example of 650° C., to a temperature below the critical temperature, for example, roughly 300° C., takes place quickly to achieve the desired tempering effect. Preheating and cooling to room temperature can then be done slowly without any adverse effect on the tempering of the glass plates. The adverse, nonuniform surface stresses which lead to undulations in the glass plates and which form in the known processes are avoided.

Other details and features of the invention result from the following description of the glass plate tempering system shown by way of example in the drawings.

Figure 1:
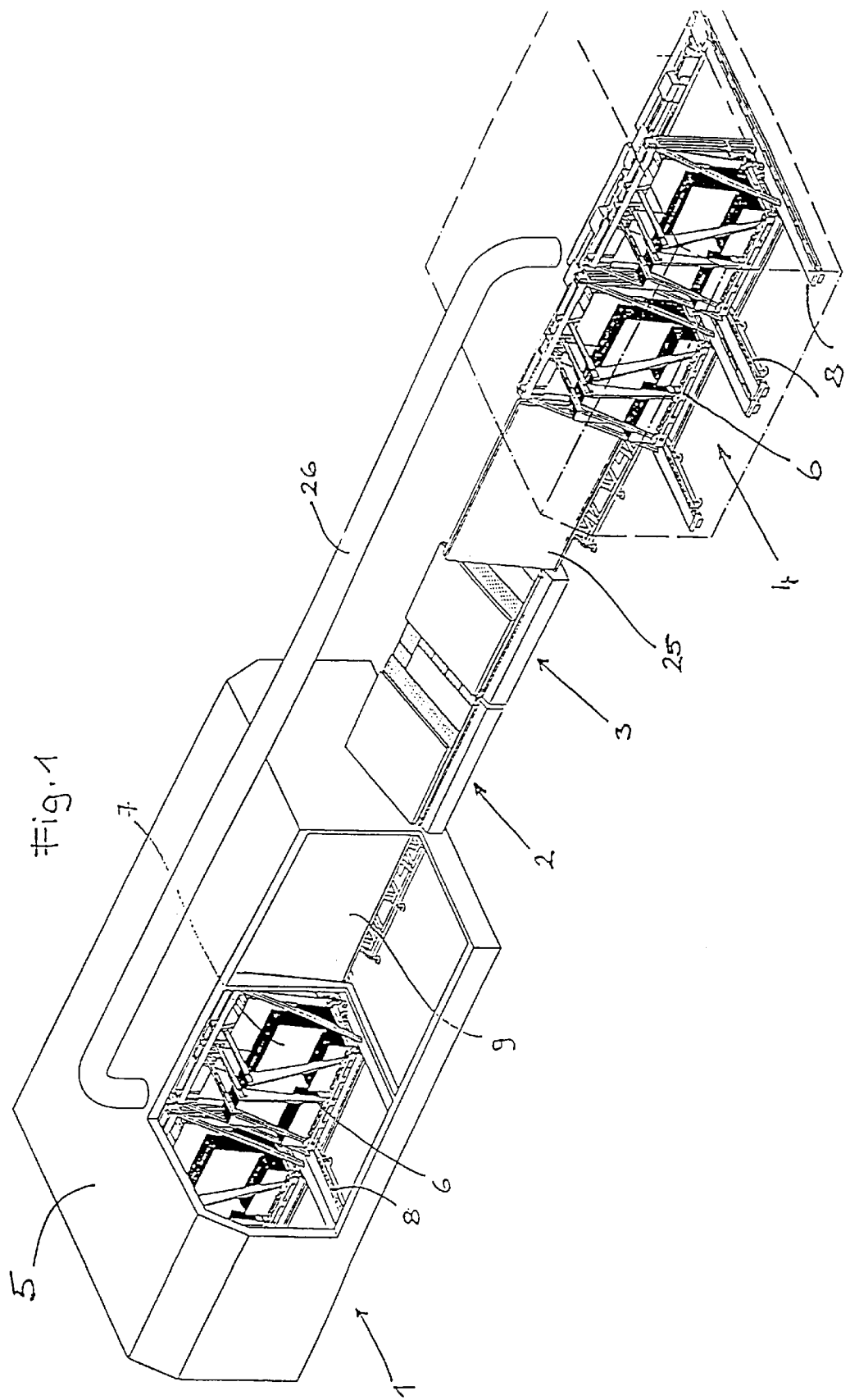
FIG. 1 shows the overall system in an oblique view.

The system as claimed in the invention which is shown in FIG. 1 consists of four zones, specifically preheating zone 1, heating zone 2, cooling zone 3 and after-cooling zone 4.

In preheating zone 1 which is housed in closed chamber 5, glass plates 7 standing in shelves, for example compartmented cars 6, are preheated together and heated for example to a temperature of roughly 300° C. Compartmented cars 6 used in preheating zone 1 can have a construction as they are known from EP 603 151 A or EP 704 389 A. Only the bottom and side rollers or sleeve-shaped slide parts of compartmented cars 6 are made of a correspondingly temperature resistant material due to the high temperature stress.

As shown in FIG. 1, compartmented cars 6 are guided to move on rails 8 transversely to the alignment of the compartments which hold glass plates 7 and which are provided in the cars so that a selected preheated glass plate 7 can be delivered to tilt table 9, from which it is conveyed with the inclined position which corresponds to heating zone 2 from preheating chamber 5 to heating zone 2. Tilt table 9 is advantageously made with a support surface executed as an air cushion wall.

Figure 3:
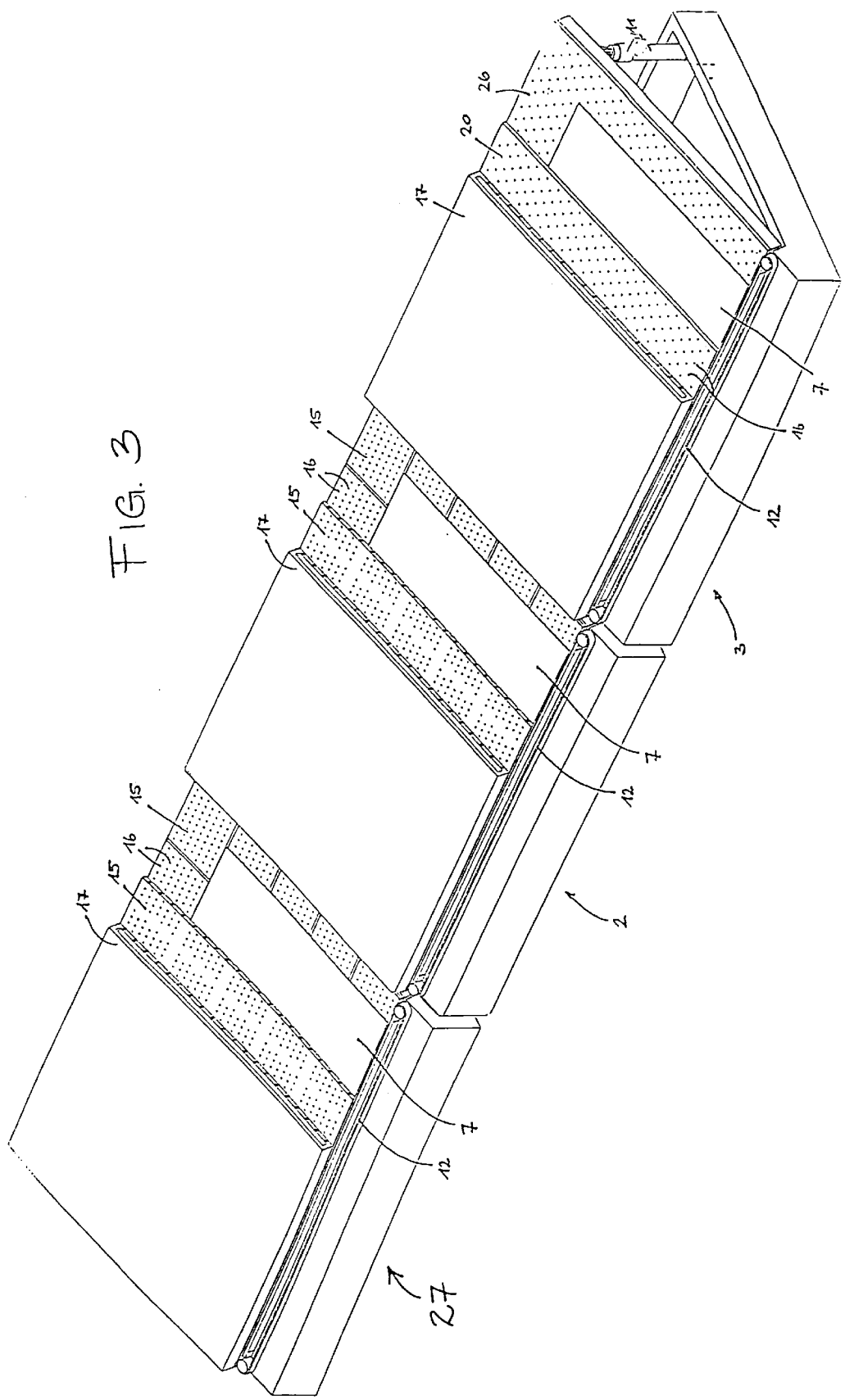
FIG. 3 shows two heating zones and one quenching zone.

According to one embodiment, between preheating chamber 5 in which glass plates 7 are jointly preheated, and heating zone 2 in which glass plates 7 are heated individually for example to a temperature of 650° C., there can be another heating zone 27 in which glass plates 7 are heated individually to a temperature between the temperature in preheating chamber 5 and that of heating zone 2. This embodiment is shown in FIG 3.

One advantage of preheating chamber 5 in which several glass plates 7 are heated together is that the heating can take place accordingly slowly and thus with low energy consumption, since there is enough time for preheating. Thus in the embodiment it is shown that in chamber 5 there are several, for example, two compartmented cars 6 and that compartmented car 6 loaded with glass plates 7 and moved last into preheating chamber 5 is only moved into the removal point provided next to tilt table 9 when compartmented cars 6 located at the removal point have been emptied. Then new compartmented car 6 filled with glass plates 7 is moved into the waiting zone of preheating chamber 5 and glass plates 7 located in it are slowly heated up.

Figure 2:
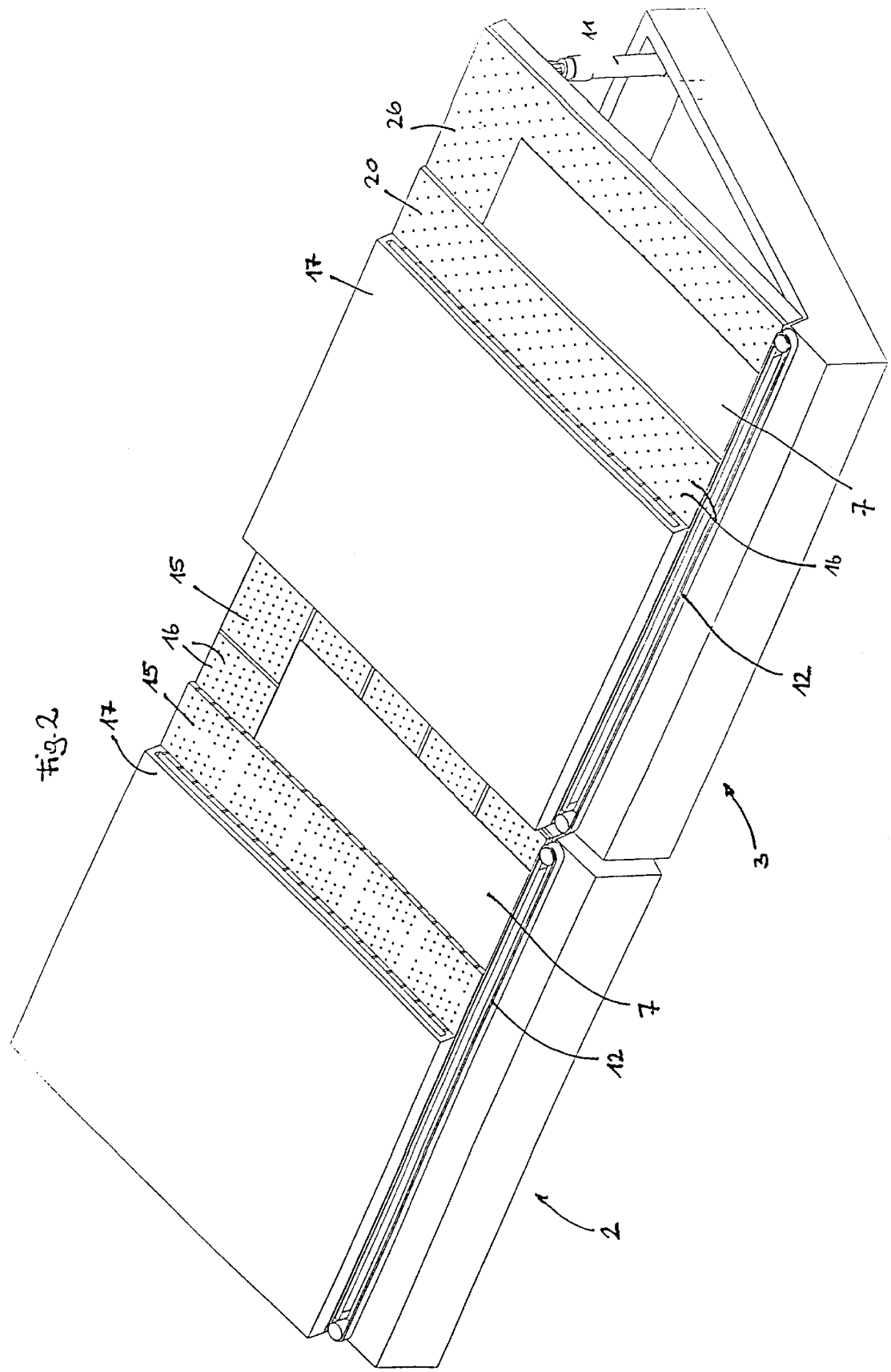
FIG. 2 shows the heating and quenching zone in a larger view.

Heating zone 2 is shown in FIG. 2 in more detail. In contrast to known heating zones for heating of glass plates in their tempering heating zone 2 as claimed in the invention is aligned such that glass plates 7 are aligned, not horizontally, but tilted almost to vertical. To do this heating zone 2 (like cooling zone 3 downstream of it) is aligned with tilt adjustment 11, for example in the form of pneumatic or hydraulic cylinders, so that the tilt of heating zone 2 or glass plates 7 located in it can be adjusted according to requirements (size and thickness of the glass plate). In this way the problems in transport and support of glass plates (deformation/sagging) which occur in heating zones with horizonal glass plates are prevented.

For support on the lower edge of glass plate 7 there is transport device 12 which, as shown in the embodiment, can be a continuous transport belt, but there can also be a transport device which is made in principle as is described in DE 30 38 425 A, in which the horizontal support of the conveyor means can reach in full or in part under glass plates 7 on their lower edge. Preferably the supports which reach under glass plates 7, especially when they reach under the glass plates in their entirety, are attached offset to one another to opposing chains or other continuous conveyor elements.

In the embodiment shown heating zone 2 has two opposite heating plates 15 which leave a space between themselves for glass plates 7 to be heated and which can be heated in any manner. For example the heating system can be an electrical heating system or gas heating system.

In heating plates 15 which can have a surface made to increase and support emission of heat radiation there is a series of holes 16 which can be loaded with pressurized gas via chamber 17 so that on both sides of glass plate 7 located between heating plates 15, gas cushions, especially air cushions, form. Thus, glass plate 7 touches neither one or the other heating plate 15, but is merely supported and transported on its lower edge by transport means 12.

One embodiment of heating plates 15 is conceivable in which heating plate 15 located above glass plates 7 has no holes 16 so that heat is released for the most part by heat radiation from upper heating plate 15 onto glass plate 7 to be heated.

In the invention, heating zone 2 can therefore be made such that from lower heating plate 15 heat is released onto the glass plate primarily by radiation and convection, from upper glass plate 15 primarily by radiation.

To deliver gas to heating plates 15 to form the air cushion, an appropriately preheated compressed gas, for example, air, can be supplied to chambers 17. But it is also possible to form the air cushion by combustion gases which are formed in the burning of gas, the combustion heat being used at the same time to heat up heating plates 15.

To adapt to different glass plate sizes, heating plates 15 can be divided into sections which extend for example parallel to transport device 12, therefore to the conveyance direction, and which, depending on the length of glass plate 7 measured away from transport device 12, can be started or stopped. This saves even more energy.

Heating plates 15 are also built into the device in a manner not shown, such that the distance of heating plates 15 from one another can be changed to adapt to the thickness of the glass plate to be tempered. In doing so it is enough if upper heating plate 15 is adjustable, for example, by hydraulic cylinders or similar servo drives, relative to lower heating plate 15.

Because heating zone 2 is formed as claimed in the invention glass plate 7 is for example rapidly heated from the preheating temperature of 300° C. to the tempering temperature of for example 650° C. primarily by radiation, supported by convection.

Adjacent to heating zone 2 there is cooling zone 3 which is made identical to heating zone 2 in terms of construction, and in it there are cooling plates 20, through which for example a cooling medium flows (not shown). Exit holes 16 in two cooling plates 20 are loaded with a correspondingly cooled gas so that air cushions, now cooling, described beforehand in conjunction with heating zone 2, form, and they are located above and below glass plate 7 to be quenched, or only under glass plate 7.

Cooling plates 20 are likewise made to move relative to one another so that they can be brought closer to one another or moved farther apart. This can also be used to place cooling plates 20 briefly on both surfaces of glass plate 7 while the air cushion is turned off and transport 12 is shut down in order to accelerate quenching for purposes of tempering of glass plate 7. This approach is used preferably in thin glass plates 7. For thicker glass plates 7 it is often advantageous to deliver cold air to glass plates 7 to be quenched, generally from both sides, and to stop glass plates 7 in the area of cooling zone 3.

When cooling plates 20 are placed on glass plate 7, transport 12 in the area of cooling zone 2 is shut down to prevent undesirable relative motion between glass plate 7 and transport 12.

It should be pointed out that transport 12 can also be shut down in the area of heating zone 2 if for example glass plates 7 are so large and/or thick that they cannot be heated to the required tempering temperature in continuous operation.

Following cooling zone 3, glass plates 7 via tilt table 25 reach aftercooling zone 4 which can be housed in a chamber and which likewise contains compartmented cars 6 of the aforementioned type, in which glass plates 7 can be deposited sorted by consignments into compartmented cars 6, to then be cooled to room temperature. Here the cooling power need not be great since there is enough time for cooling. Otherwise it is possible, when aftercooling zone 4 is housed in one chamber (see the chamber in FIG. 1 illustrated with a broken line), to deliver heated air from aftercooling zone 4 into preheating zone 1 to save energy (pipeline 26).

The surfaces of cooling plates 20 facing glass plates 7 can be made to support the absorption of heat radiation. For example, the surfaces of cooling plates 20 facing one another can be made ribbed or rippled to increase the area of cooling plates 20 which absorbs heat.

In the system as claimed in the invention glass plates 7 are moved, not lying horizontally, but inclined to the vertical, for example at an acute angle, through heating zone 2 and downstream cooling zone 3 so that in the system as claimed in the invention the former problems in conjunction with supporting glass plates 7 and their transport which have often led to deformations of glass plates 7 do not arise.

By means of transport devices 12 which engage the lower edge of glass plates 7 the latter can be moved with the desired speed through heating zone 2 and cooling zone 3, it being easily possible to stop glass plates 7 if necessary in heating zone 2 and/or cooling zone 3 for a short time; this is of special interest when in cooling zone 3 cooling plates 20 are to be placed from both sides on glass plate 7 to be quenched.

Thus, like heating plates 15, cooling plates 20 can also be divided into various zones so that the area of cooling plates 20 which is active for cooling can be matched to the size of glass plate 7 to be quenched (its longitudinal extension measured away from the conveyor means).

To avoid the need to continuously turn the different zones of heating plates 15 and/or cooling plates 20 on and off, it is possible to proceed such that glass plates 7 with an identical height or one as similar as possible can be removed from preheating zone 1 and sent in succession through heating zone 2 and cooling zone 3. Tempered glass plates 7 can be sorted again by consignments in aftercooling zone 4.

In summary, one embodiment of the invention can be described as follows.

A system for tempering glass plates has preheating zone 1 in which several glass plates 7 stacked vertically in compartmented car 6 are heated together to a temperature below the tempering temperature of for example 650° C. (for example 300° C.) Preheated glass plates 7 are moved individually from preheating zone 1 into heating zone 2. In heating zone 2 glass plates 7 are heated to the tempering temperature, their being inclined to the vertical at an acute angle and being held by air cushions between two heating plates. On the lower edge of the two heating plates of heating zone 2 there is transport device which supports glass plates 7 simultaneously to the bottom. Glass plates 7 heated to the tempering temperature are moved into cooling zone 3 which has cooling plates aligned parallel to the heating plates and between which glass plate 7 is pushed for quenching. The cooling plates can also be placed on the two sides of glass plate 7 to be tempered for purposes of quenching. The quenched glass plates which still have a temperature of for example 300° C., are transported into aftercooling zone 4 in which they are slowly cooled to room temperature after being deposited in compartmented cars 6.

Because glass plates 7 are placed in heating zone 2 and cooling zone 3 obliquely, not horizontally, there are no problems with support and transport of glass plates 7. Joint preheating of glass plates 7 and joint cooling of glass plates 7 to room temperature after quenching thereof save considerable energy since the heating and cooling power in preheating zone 1 and aftercooling zone 4 can be low.

We claim:

1. Process for tempering of glass plates in which glass plates are heated to a temperature above the tempering temperature and cooled to a temperature below a critical temperature for tempering, wherein a plurality of the glass plates are simultaneously preheated to a temperature near the critical temperature, that the glass plates preheated in this way are individually heated to a temperature above the tempering temperature so that only one of the glass plates is heated at one time, that the glass plates are individually quenched to a temperature below the critical temperature so that only one of the glass plates is quenched at one time, and that a plurality of the glass plates are then simultaneously cooled to room temperature.

2. Process as claimed in claim 1, wherein the glass plates are aligned at an acute angle to the vertical when individually heated to a temperature above the tempering temperature and when individually quenched to a temperature below the critical temperature.

3. Process as claimed in claim 1, wherein when individually heated and individually quenched the glass plates are supported in a heating zone and a cooling zone bordered by heating plates and cooling plates respectively at least from underneath by compressed gas cushions and are supported and transported on their horizontal edge.

4. Process as claimed in claim 1, wherein the glass plates for tempering are heated to a temperature above 650° C.

5. Process as claimed in claim 1, wherein the glass plates during tempering are quenched to a temperature below 300° C.

6. Process as claimed in claim 1, wherein the glass plates before heating are preheated to a temperature of 300° C.

7. Process as claimed in claim 3, wherein the gas pressure cushion is formed in the area of the heating zone by heated air or combustion gases.

8. Process as claimed in claim 3, wherein the gas pressure cushion is formed in the area of the cooling zone by cooled air.

9. Process as claimed in claim 3, wherein the cooling plates bordering the cooling zone are placed on the glass plate from both sides to quench it.

10. Process as claimed in claim 3, wherein the glass plates are transported through the heating zone and/or cooling zone at a speed matched to their thickness and optionally stopped temporarily in the heating zone or cooling zone.

11. Process as claimed in claim 1, wherein hot exhaust air from the aftercooling zone is used for heating in the preheating zone.

12. Process as claimed in claim 3, wherein heating in the heating zone takes place preferably by convection caused by the compressed gas and by radiation.

13. Device for executing the process as claimed in claim 1, comprising a heating zone (2) and cooling zone (3) downstream from the heating zone, in which there are heating plates (15) or cooling plates (20) which are at a distance from one another and which lie at an acute angle to the vertical, and wherein in front of the heating zone (2) there is a preheating zone (1) and after the cooling zone (3) there is an aftercooling zone (4);

wherein the preheating zone and the aftercooling zone are structured and arranged to contain a plurality of the glass plates simultaneously, and wherein the heating and cooling zones are structured and arranged to contain only one said glass plate at one time.

14. Device as claimed in claim 13, wherein the mutual distance of heating plates (15) in heating zone (2) and the mutual distance of cooling plates (20) in cooling zone (3) can be changed.

15. Device as claimed in claim 13, wherein on the lower edge of heating plates (15) and on the lower edge of cooling plates (20) there is transport device (12).

16. Device as claimed in claim 13, wherein the incline of heating plates (15) and cooling plates (20) to the vertical can be changed.

17. Device as claimed in claim 13, wherein preheating zone (1) comprises preheating chamber (5), and wherein in preheating chamber (5) there are shelves (6) for holding several glass plates (7) to be preheated at the same time.

18. Device as claimed in claim 13, wherein aftercooling zone (4) optionally comprises an aftercooling chamber and wherein in aftercooling zone (4) there are shelves (6) for holding several glass plates (7) to be cooled at the same time.

19. Device as claimed in claim 13, wherein at least in heating plates (15) located under glass plates (7) to be heated there are holes (16) for exit of compressed gas for purposes of forming an air cushion between heating plate (15) and glass plate (7) to be heated.

20. Device as claimed in claim 13, wherein in cooling plate (20) located under glass plate (7) to be cooled, but preferably in two cooling plates (20) in the surfaces facing glass plate (7) there are holes (16) for exit of cooled gas for forming air cushions between cooling plates (20) and glass plate (7) to be quenched.

21. Device as claimed in claim 13, wherein heating plates (15) are equipped with electrical heating.

22. Device as claimed in claim 13, wherein heating plates (15) are heated by combustion gases from at least one gas burner.

23. Device as claimed in claim 13, wherein combustion gases emerge through gas exit holes (16) in heating plates (15).

24. Device as claimed in claim 17, wherein between shelves (6) for holding glass plates (7) in preheating chamber (5) and heating zone (2) there is tilt table (9) for swivelling glass plates (7) into the oblique position of heating zone (2).

25. Device as claimed in claim 13, wherein after cooling zone (3) there is tilt table (25) for aligning glass plates (7) from the inclined position of cooling zone (3) into the position in which they can be deposited in the compartments of shelf (6) in aftercooling zone (4).

26. Device as claimed in claim 17, wherein the shelves in the preheating chamber (5) and/or aftercooling chamber (4) are made as compartmented cars (6) which can be moved transversely to the conveyance direction.

27. Device as claimed in claim 13, wherein there is line (26) which joins the vent opening of aftercooling chamber (4) to preheating chamber (5).

28. Device as claimed in claim 13, wherein heating plates (15) are divided into several sections which can be heated independently of one another.

29. Device as claimed in claim 13, wherein plates (20) of cooling zone (2) are divided into several sections which can be cooled independently of one another.

30. Device as claimed in claim 28, wherein heating plates (15) and/or cooling plates (20) are divided into strip-shaped sections which extend parallel to transport direction (12) on the lower edge of heating zone (2) and/or cooling zone (3).

31. Device as claimed in claim 13, wherein between preheating zone (1) in which several glass plates (7) are preheated at the same time and heating zone (2) there is a device for further heating of individual glass plates (7).

* * * * *